United States Patent
Ellis-Monaghan et al.

(10) Patent No.: US 7,821,553 B2
(45) Date of Patent: Oct. 26, 2010

(54) PIXEL ARRAY, IMAGING SENSOR INCLUDING THE PIXEL ARRAY AND DIGITAL CAMERA INCLUDING THE IMAGING SENSOR

(75) Inventors: John J. Ellis-Monaghan, Grand Isle, VT (US); Mark D. Jaffe, Shelburne, VT (US); Alain Loiseau, Williston, VT (US); Richard J. Rassel, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 11/275,417

(22) Filed: Dec. 30, 2005

(65) Prior Publication Data

US 2007/0153104 A1 Jul. 5, 2007

(51) Int. Cl.
 H04N 3/14 (2006.01)
 H04N 5/335 (2006.01)
 H04N 9/04 (2006.01)
 H04N 9/083 (2006.01)
(52) U.S. Cl. .................................................. 348/277
(58) Field of Classification Search ................. 348/234, 348/273, 276, 277, 279, 280, 308, 275; 345/589
 See application file for complete search history.

(56) References Cited

U.S. PATENT DOCUMENTS

| | | | | |
|---|---|---|---|---|
| 4,710,803 A * | 12/1987 | Suzuki et al. | ............... | 348/275 |
| 4,939,573 A * | 7/1990 | Teranishi et al. | ............. | 348/276 |
| 5,172,220 A | 12/1992 | Beis | | |
| 5,798,542 A | 8/1998 | Anagnostopoulos et al. | | |
| 6,137,100 A | 10/2000 | Fossum et al. | | |
| 6,359,323 B1 | 3/2002 | Eom et al. | | |
| 6,455,831 B1 | 9/2002 | Bandera et al. | | |
| 6,476,865 B1 * | 11/2002 | Gindele et al. | ............... | 348/277 |
| 6,661,457 B1 * | 12/2003 | Mathur et al. | ............... | 348/273 |
| 6,704,046 B2 * | 3/2004 | Dyas et al. | ............... | 348/223.1 |
| 6,714,243 B1 * | 3/2004 | Mathur et al. | ............... | 348/273 |
| 6,757,012 B1 * | 6/2004 | Hubina et al. | ............ | 348/222.1 |
| 6,781,626 B1 * | 8/2004 | Wang | ......................... | 348/273 |
| 6,787,749 B1 | 9/2004 | Zhou et al. | | |
| 6,867,549 B2 * | 3/2005 | Cok et al. | ................. | 315/169.3 |
| 6,876,384 B1 * | 4/2005 | Hubina et al. | ............ | 348/223.1 |
| 7,126,633 B2 * | 10/2006 | Saito | .......................... | 348/279 |
| 7,414,630 B2 * | 8/2008 | Schweng et al. | ............ | 345/589 |

(Continued)

OTHER PUBLICATIONS

Frame, One Chip, Low Light Level Color Camera, Nov. 13, 2003.

(Continued)

*Primary Examiner*—Jason Whipkey
*Assistant Examiner*—Dennis Hogue
(74) *Attorney, Agent, or Firm*—Law Office of Charles W. Peterson, Jr.; Anthony Canale

(57) ABSTRACT

A pixel array in an image sensor, the image sensor and a digital camera including the image sensor. The image sensor includes a pixel array with colored pixels and unfiltered (color filter-free) pixels. Each unfiltered pixel occupies one or more array locations. The colored pixels may be arranged in uninterrupted rows and columns with unfiltered pixels disposed between the uninterrupted rows and columns. The image sensor may in CMOS with the unfiltered pixels reducing low-light noise and improving low-light sensitivity.

5 Claims, 5 Drawing Sheets

U.S. PATENT DOCUMENTS

| | | | |
|---|---|---|---|
| 2003/0197799 A1* | 10/2003 | Dyas et al. | 348/308 |
| 2005/0231618 A1* | 10/2005 | Sugiyama | 348/273 |
| 2005/0237447 A1 | 10/2005 | Kikuo | |
| 2005/0248667 A1* | 11/2005 | Schweng et al. | 348/234 |
| 2006/0044427 A1* | 3/2006 | Hu | 348/266 |
| 2006/0055800 A1* | 3/2006 | Ackland et al. | 348/308 |
| 2007/0002149 A1* | 1/2007 | Oda | 348/222.1 |
| 2007/0024931 A1* | 2/2007 | Compton et al. | 358/512 |
| 2007/0145273 A1* | 6/2007 | Chang | 250/338.1 |
| 2007/0257998 A1* | 11/2007 | Inoue | 348/272 |

OTHER PUBLICATIONS

Merrill et al., Vertical Color Filter Sensor Group with Carrier-Collection Elements of Different Size and Method for Fabbrication Such a, Sensor Group. Sep. 16, 2004.

* cited by examiner

PIXEL ARRAY, IMAGING SENSOR INCLUDING THE PIXEL ARRAY AND DIGITAL CAMERA INCLUDING THE IMAGING SENSOR

BACKGROUND OF THE INVENTION

1. Field of the Invention

The present invention generally relates to image sensors and more particularly to high resolution image sensors.

2. Background Description

Digital cameras have largely replaced film based analog cameras, at least for amateur photography. A typical digital camera image sensor is an array of picture cells (pixels), each sensing a small fragment of the light for an entire image. Generally, the higher the number of pixels, the better the resulting images (pictures) and the larger an image may be viewed before becoming pixilated. Thus, the number of pixels is a primary measure of the image resolution, and directly affects the sharpness and crispness of the resulting images. Early digital cameras included bucket brigade sensors with Charge Coupled Devices (CCDs) for pixel sensors. Integration, power, and frame rate considerations have driven the industry to convert from CCDs to image sensors that are based on more standard CMOS logic semiconductor processes.

A typical CMOS image sensor array is, simply, an array of photodiodes with connected CMOS support and sensor circuits. Light striking each photodiode changes its current-voltage (I/V) characteristic and the CMOS support senses characteristic changes in each diode. A color pixel sensing red, green or blue is just an appropriately filtered diode, with a red, green or blue filter to block all light outside of the particular bandwidth, i.e., red, green or blue. CMOS image sensors have allowed pixel density to increase well above 4 MegaPixels (4 MP), even as typical digital cameras have gotten more and more compact, e.g., some are even embedded in cell phones.

Unfortunately, as pixel areas have shrunk to improve density, the amount of light to each sensor, which is directly related to photodiode surface area, has also diminished. So for CMOS sensors in particular, as pixel density has increased, the diminished sensor light (sensor signal) may be lost in chip noise, especially in low light conditions. For example, compact cameras with 6-8MP resolution, have been criticized for noisy results, even for pictures taken at sensitivity settings as low as 100 (ISO 100). Thus, this noise is an impediment to increasing pixel density for CMOS imaging sensors, while maintaining a small chip footprint for compact applications.

Thus, there is a need for improved CMOS imaging sensor sensitivity, especially under low light and reduce CMOS sensor low light noise.

SUMMARY OF THE INVENTION

It is therefore a purpose of the invention to improve CMOS imaging sensor sensitivity;

It is another purpose of this invention to improve low light sensitivity for CMOS imaging sensor;

It is yet another purpose of the invention to reduce noise in CMOS sensor images at low light;

It is yet another purpose of the invention to reduce CMOS sensor image noise, while improving CMOS imaging sensor low light sensitivity.

The present invention is related a pixel array in an image sensor, the image sensor and a digital camera including the image sensor. The image sensor includes a pixel array with colored pixels and unfiltered (color filter-free) pixels. Each unfiltered pixel occupies one or more array locations. The colored pixels may be arranged in uninterrupted rows and columns with unfiltered pixels disposed between the uninterrupted rows and columns. The image sensor may be implemented in CMOS with the unfiltered pixels reducing low-light noise and improving low-light sensitivity.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
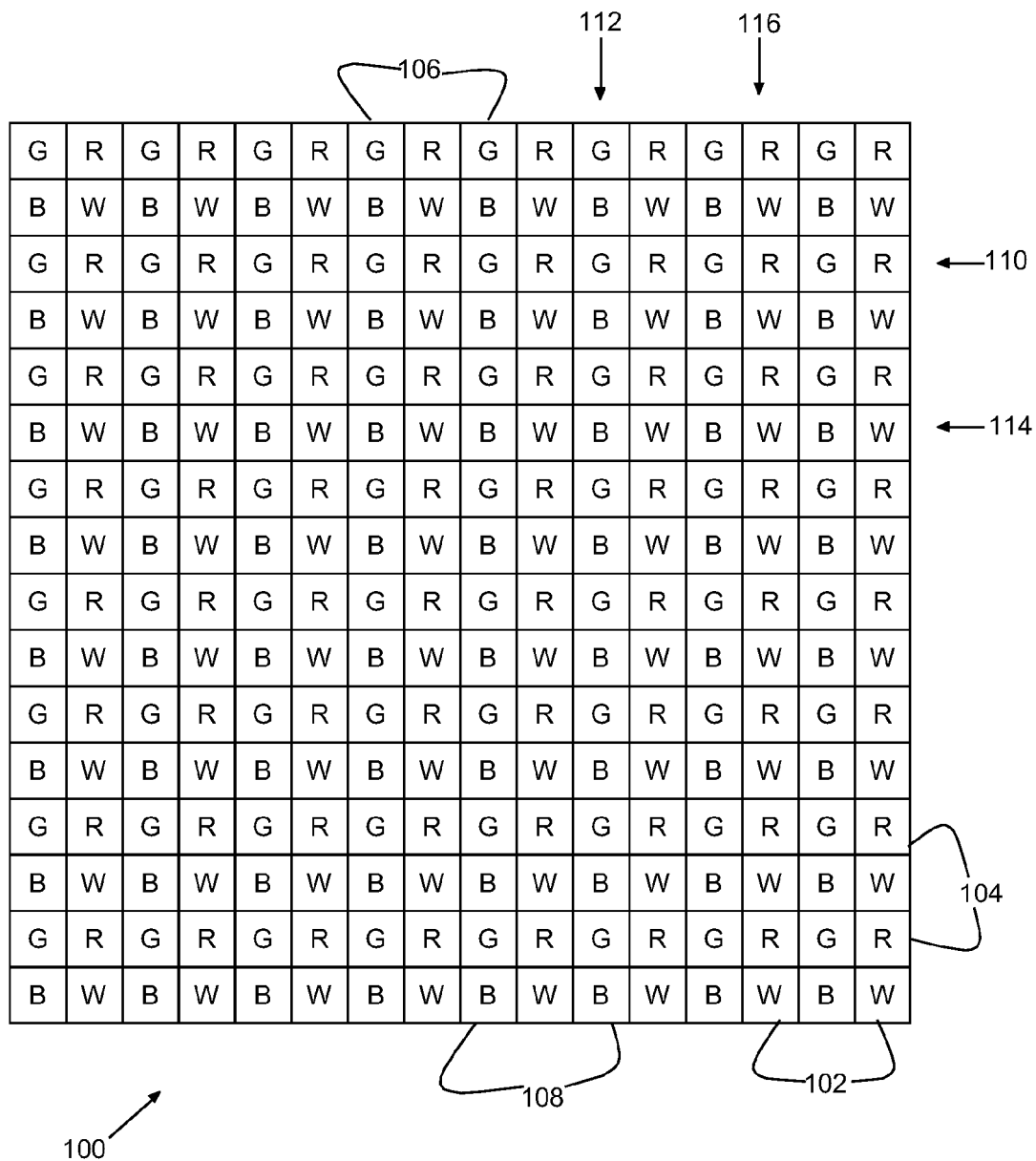
FIG. 1 shows a first example of a color pixel array with unfiltered photosensors or light efficient cells included with red, green or blue filtered photosensor cells for improved sensitivity according to a preferred embodiment of the present invention.

Turning now to the drawings, and more particularly, FIG. 1 shows a first example of a color pixel array 100, wherein unfiltered photosensors or light efficient cells (LECs) 102 are included with red, green or blue filtered photosensor cells or pixels 104, 106 and 108, respectively, for improved sensitivity according to a preferred embodiment of the present invention. In this example, the pixels 102, 104, 106 and 108, are all of substantially equal size, each occupying a single array location. Also, the array 100 includes an equal number of each pixel type 102, 104, 106 and 108, such that 25% of the array is light efficient cells 102. Further in this example, the photodiodes 102, 104, 106 and 108 are arranged into red-green pixel rows 110 and blue-green pixel columns 112 bordering each LEC 102 and forming blue-LEC pixel rows 114 and red-LEC pixel columns 116.

Since the filters block light outside of the filtered spectrum from reaching the photosensors for the color filtered pixels 104, 106 and 108, omitting the color filter allows light across the full visible spectrum to reach the photosensors in the light efficient cells 102. So, the light efficient cells 102 receive the full photon distribution striking the pixel 102, and sense even what would be blocked with a filter in place. Thus, the typical collected dose increases for each group of 4 pixels 102, 104, 106 and 108 over, e.g., a state of art Bayer red, green, blue array. For white light, for example, the energy collected for a group of 4 pixels, increases by greater than 50%. So, especially in low light, the light efficient cells 102 facilitate collecting much cleaner information for improved picture depth resolution. Although the present invention has application in almost any suitable photosensor technology including CCDs, preferably, the color pixel array 100 is an array of photodiode sensors implemented in the insulated gate Field Effect Transistor (FET) semiconductor technology known as CMOS.

Figure 2:
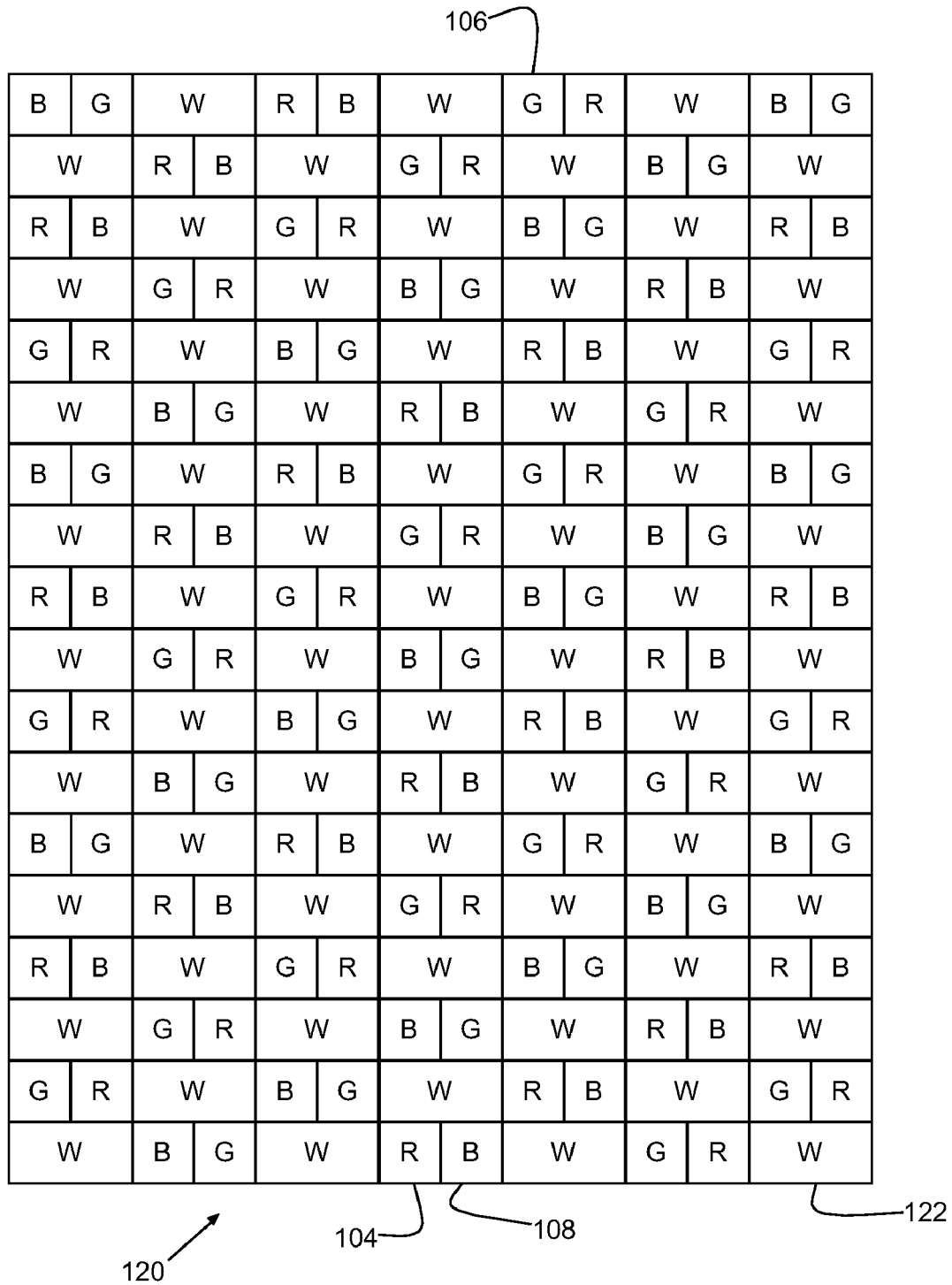
FIG. 2 shows another example of a color pixel array that collects even cleaner image information in low light and with improved picture depth resolution.

FIG. 2 shows another example of a color pixel array 120 that collects even cleaner image information in low light and with additional improvement in picture depth resolution, according to another preferred embodiment of the present invention. In this preferred embodiment, light efficient cells 122 have twice the pixel area of the red, green or blue filtered pixels 104, 106 and 108, respectively, with red-blue pairs 124, green-red pairs 126, and blue-green pairs 128, positioned diagonally along the array 120. Also in this example, for each pair of filtered photosensor cells 104, 106 and 108, there is one such light efficient cell 122. Therefore, the light efficient cells 122, which are twice as large as the standard colored cells 104, 106 and 108, occupy 50% of this array 120 and can be produced in two different ways. In the simplest way, only the color filter may be changed for the array by design, selectively omitting color where appropriate with two photo normal sized diodes under clear filter areas. Alternately, the color filter design change may be made in combination with a photo diode design change. So, in addition to the color filter change, the photo diode area is expanded for a single larger photo diode (instead of two) under larger clear filter areas. This larger photo diode is larger than a standard photo diode, and thus, has greater charge capacity.

So, although the pixel density falls because of including the double sized light efficient cells 122, each light efficient cell 122 receives more than six times the dose (twice as large and greater than three times the unfiltered dose) as each of the filtered pixels 104, 106 and 108. Thus, the per unit area energy received is more than triple that of a state of art Bayer red, green, blue array, for example, for marked improvement, especially in low light. Further, even though the spatial resolution in normal or high light may be slightly less than the resolution normally achieved with a state of the art Bayer pattern sensor; the image improvement in low light as well as low light depth resolution improvement for this embodiment, more than offsets any such loss.

Figure 3A:
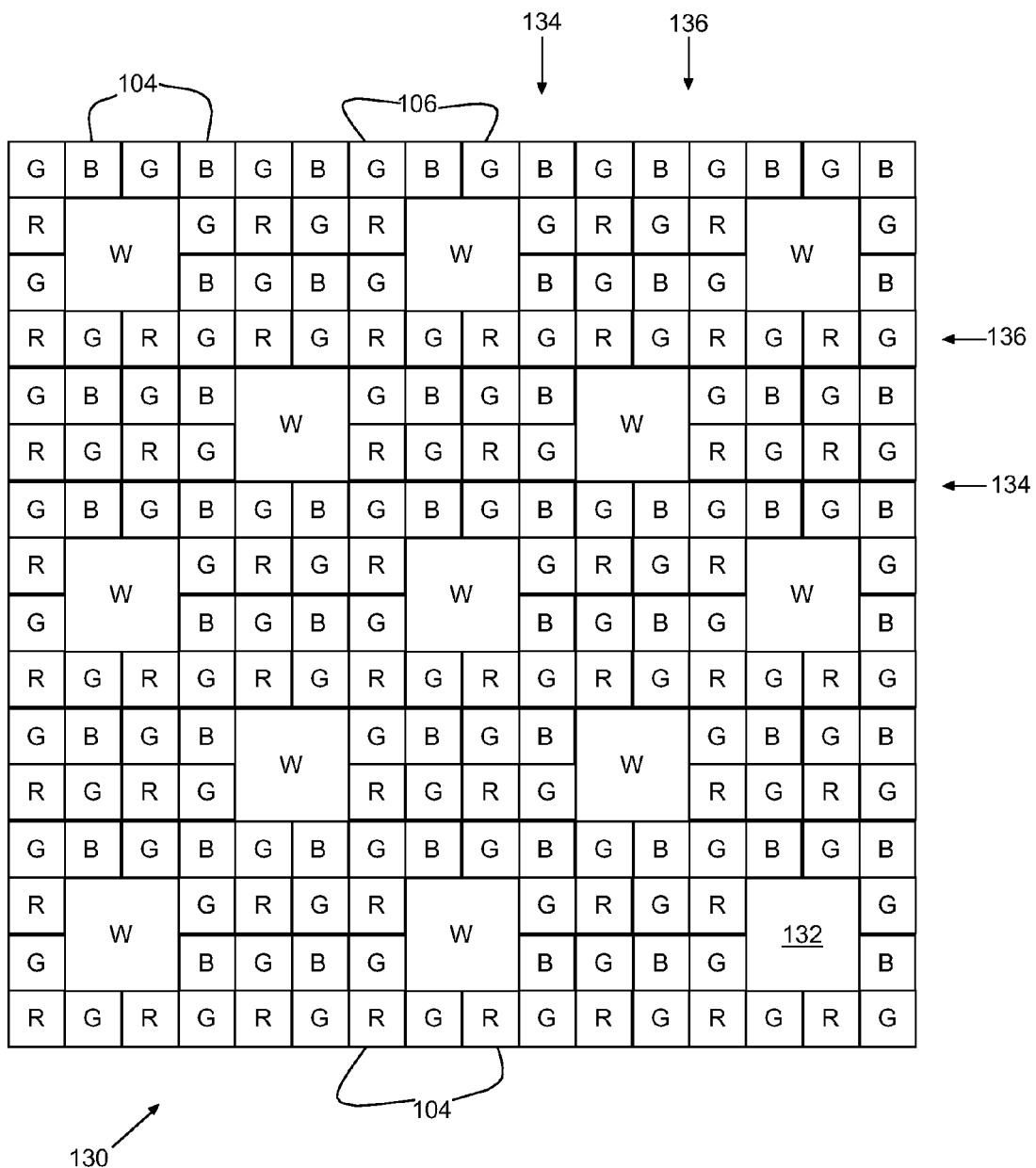
FIGS. 3A-C show other color pixel array examples with light efficient cell variations.
Figure 3B:
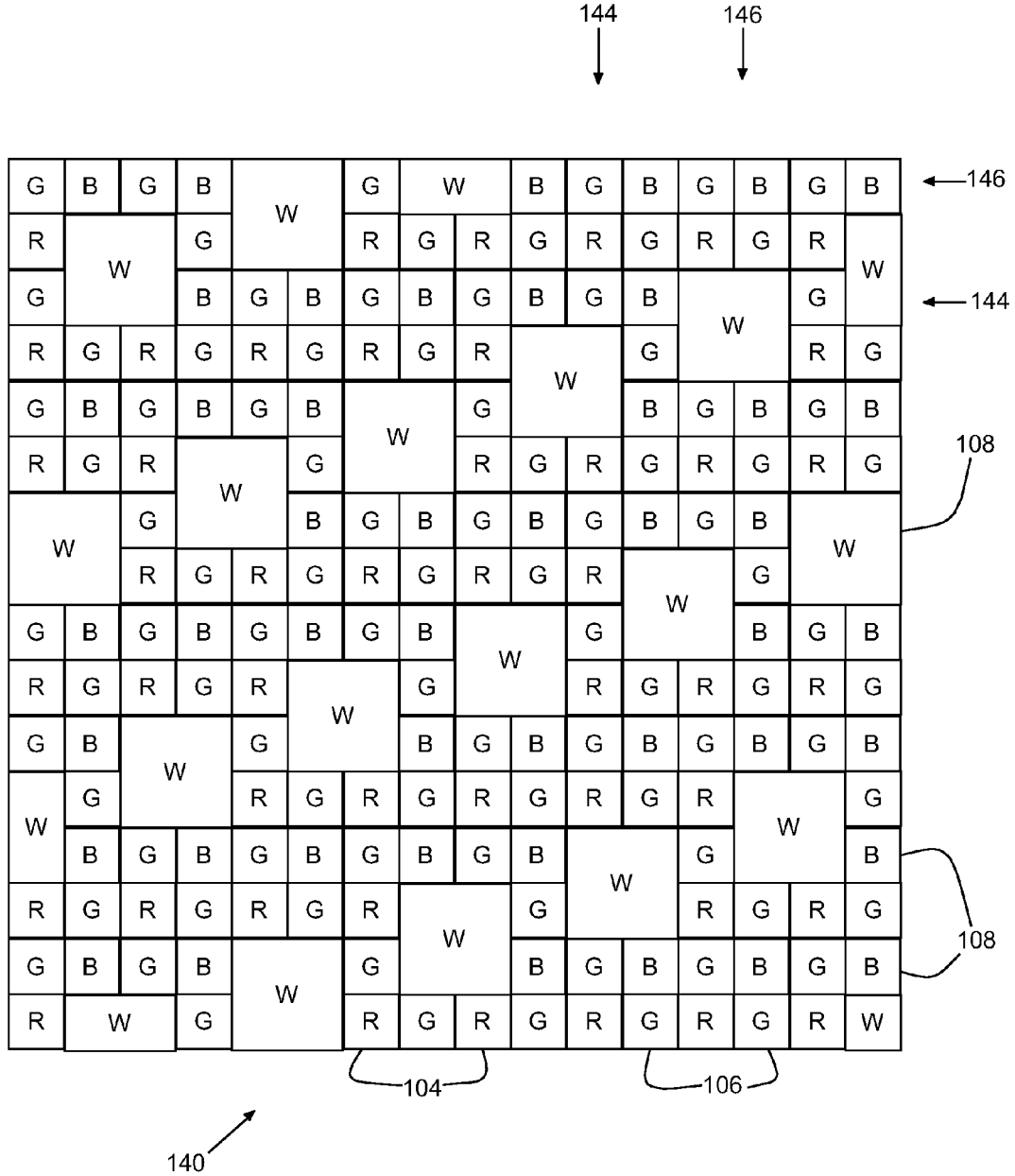
Figure 3C:
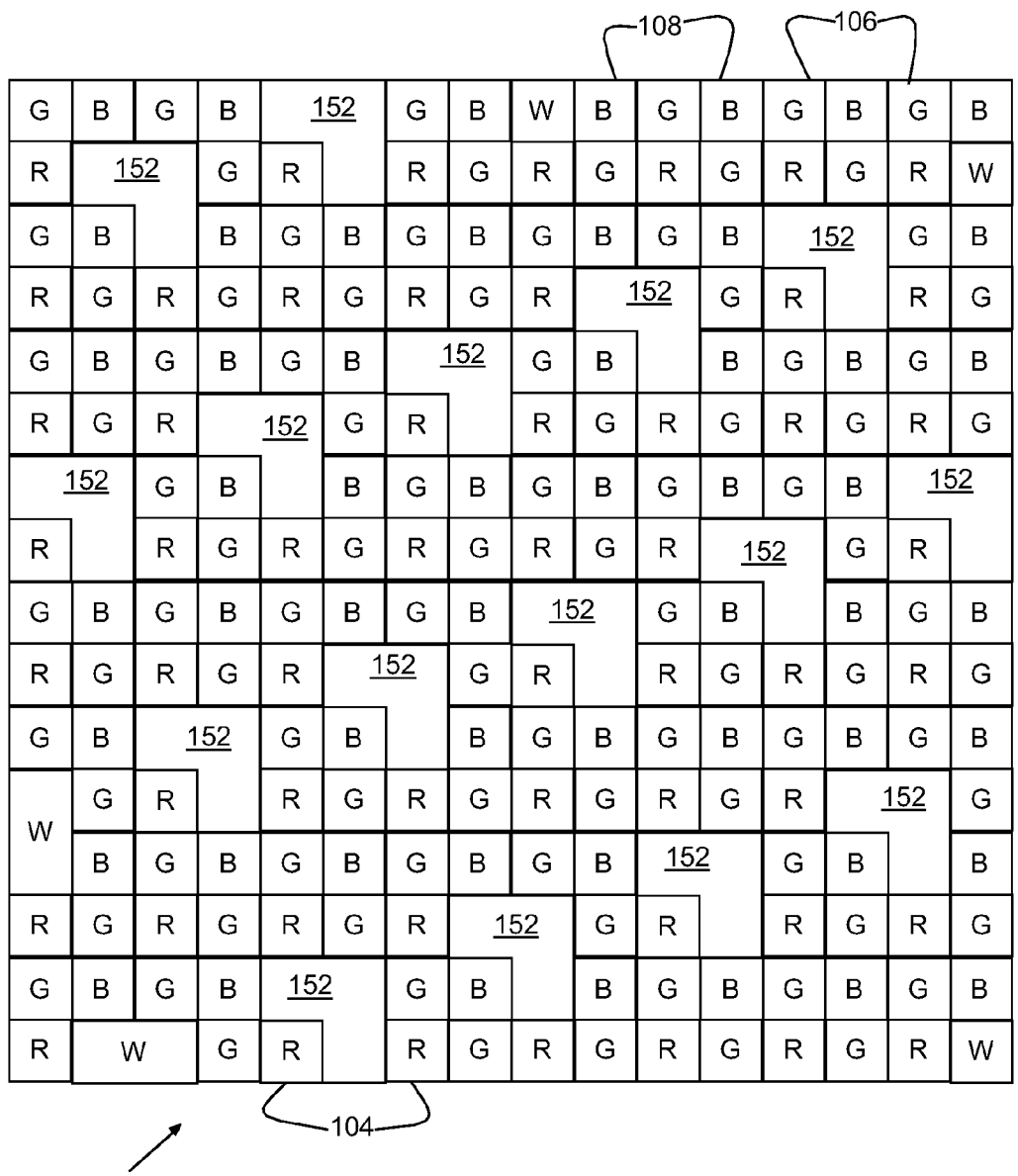

FIGS. 3A-C show color pixel array example variations 130, 140, 150 wherein still larger light efficient cells 132, 142, 152, respectively. In these preferred variations, the light efficient cells 132, 142, 152 have three to four times the area of the color filtered pixels, 104, 106 and 108. Also in this example, color filtered pixels, 104, 106 and 108, are spaced unevenly throughout the arrays 130, 140, 150, effectively forming bi-colored pixel clusters to enhance depth resolution even for a coarser (non-pixel) level resolution images. As with the array variation 120 shown in FIG. 2, the large clear pixels 132, 142, 152 in each of these variations 130, 140, 150 can be produced by either just a large clear filter shape over multiple standard sized photo diodes, or by a single large photo diode under the large clear filter.

So, array 130, which has a pattern of alternating rows and columns of blue-green pixels and of red-green pixels, also includes 4-spot light efficient cells 132 bounded by uninterrupted rows and columns of blue-green pixels 134 and of red-green pixels 136. Similarly, array 140 has alternating rows and columns of blue-green pixels 144 and alternating rows and columns red-green pixels 146, that are interrupted by staggered light efficient cells 142. Array 150 also includes rows and columns of blue-green pixels 154 and of red-green pixels 156 interrupted by staggered 3-spot L-shaped light efficient cells 152 in this example. Although the examples of FIG. 2 and FIGS. 3A-C are each described with single diode light efficient cells, 122, 132, 142, and 152, this is for example only and not intended as a limitation. Each of the light efficient cells, 122, 132, 142 and 152, may be formed by a group of adjacent unfiltered diodes, e.g., 2, 3, 4 or more. Further, although described herein with reference to color filters being located with color pixels, this is for example only and not intended as a limitation. Instead, any photon selective sensor may be used for color pixels, e.g., photodiodes that are sensitive across the visible frequency spectrum may be included with photodiodes that are sensitive across a narrow visible energy band.

Figure 4:
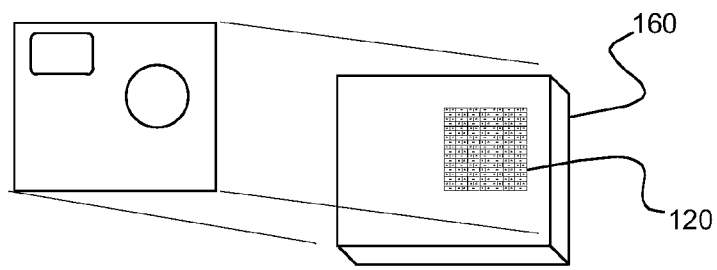
FIG. 4 shows an example of a digital camera with a preferred embodiment imaging sensor array.

FIG. 4 shows an example of application of a preferred embodiment array, e.g., 120 of FIG. 2. Thus, the array 120 is included as an image sensor in a digital camera 160. Such applications of imaging sensors, and digital cameras as well, are well known in the art.

Advantageously, a preferred embodiment imaging array has improved sensor sensitivity with reduced noise even at low light. Preferred embodiment LECs compensate for low levels of filtered light reaching individual color pixels. Thus, the present invention is particularly suited for CMOS sensor applications, e.g., for high resolution compact cameras, and without substantially expanding the chip footprint.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

We claim:

1. An imaging sensor structure comprising:
a plurality of pixels arranged in at least one row, wherein said plurality of pixels is an array of pixels; and
a first type pixel located adjacent to a second type pixel in said at least one row, wherein said first type pixel includes a color filter, said second type pixel is a color filter-free light efficient cell (LEC) collecting three times the per unit area energy of the first type pixel, LECs having at least twice the light sensing area of the first type pixels, each LEC not sharing a common boundary with any other LEC and sensing all light to the respective light sensing area independently of light sensed by each other LEC, wherein said surface area of said second type pixel is L-shaped occupying two rows in one column and two columns in one row and being greater than said surface area of said first type pixel, and wherein said imaging sensor is a CMOS imaging sensor comprises diagonals of green pixels interleaved with diagonals of alternating blue pixels and red pixels, said diagonals being periodically interrupted by said plurality of L-shaped LECs.

2. A CMOS imaging sensor comprising:
a two dimensional pixel array of photodiodes;
a plurality of pixels in said pixel array being color pixels, each of said color pixels being sensitive to light within a selected color frequency band, wherein said pixel array comprises diagonals of green pixels and diagonals of blue pixels and red pixels; and
remaining pixels in said pixel array being occupied by light efficient cells (LECs), said LECs being non-contiguous and sensitive to light in a frequency range including each said selected color frequency band, and collecting three times the per array location energy of the first type pixel and having at least twice the light sensing area of the first type pixels, each LEC sensing all light to the respective light sensing area independent from each other LEC, wherein said LECs are L-shaped occupying two rows in one column and two columns in one row, and wherein pixels in said pixel array are arranged in diagonals of green pixels interleaved with diagonals of alternating blue pixels and red pixels, said diagonals of green pixels being periodically interrupted by said plurality of L-shaped LECs.

3. A CMOS imaging sensor as in claim 2, wherein said color pixels include red, green and blue pixels, each color pixel occupying a single array location.

4. A digital camera including a CMOS imaging sensor, said CMOS imaging sensor comprising:
- a two dimensional pixel array of photodiodes;
- a plurality of pixels in said pixel array occupying single array locations and being color pixels;
- a first plurality of said color pixels being red pixels;
- a second plurality of said color pixels being green pixels;
- remaining ones of said color pixels being blue pixels; and
- remaining pixels in said pixel array being occupied by light efficient cells (LECs) having at least twice the light sensing area of said color pixels, said LECs being non-contiguous and sensitive to light in a frequency range including the red, green and blue visible frequency band, each LEC sensing all light to the respective light sensing area independent from each other LEC, wherein said LECs are L-shaped occupying two rows in one column and two columns in one row, wherein pixels in said pixel array are arranged in diagonals of green pixels interleaved with diagonals of alternating blue pixels and red pixels, said diagonals being periodically interrupted by said plurality of L-shaped LECs.

5. A digital camera including an imaging sensor, said imaging sensor comprising:
- a pixel array of a plurality of color filtered pixels arranged a plurality of rows and columns, wherein said plurality of color filtered pixels comprises a plurality of red, green and blue color filtered pixels, each occupying one array location; and
- a plurality of light efficient cells (LECs) non-contiguous and distributed throughout said pixel array, each of said plurality of LECs occupying at least two array locations, each LEC collecting three times the per array location energy of the first type pixel and having at least twice the light sensing area of the first type pixels, each LEC sensing all light to the respective light sensing area independent from each other LEC, wherein said imaging sensor is a CMOS imaging sensor comprising diagonals of green pixels interleaved with diagonals of alternating blue pixels and red pixels, said diagonals being periodically interrupted by said plurality of LECs, each of said LECs being L-shaped and occupying two rows in one column and two columns in one row.

* * * * *